US010433081B2

(12) United States Patent
Neumann et al.

(10) Patent No.: US 10,433,081 B2
(45) Date of Patent: Oct. 1, 2019

(54) CONSUMER ELECTRONICS DEVICE ADAPTED FOR HEARING LOSS COMPENSATION

(71) Applicant: JACOTI BVBA, Boechout (BE)

(72) Inventors: Joachim Neumann, Barcelona (ES); Nicolas Wack, Barcelona (ES); Nun Mendez Rodriguez, Barcelona (ES); Nigel Steven Grange, Barcelona (ES); Jacques Kinsbergen, Boechout (BE)

(73) Assignee: JACOTI BVBA, Boechout (BE)

( * ) Notice: Subject to any disclaimer, the term of this patent is extended or adjusted under 35 U.S.C. 154(b) by 190 days.

(21) Appl. No.: 14/412,752

(22) PCT Filed: Jul. 8, 2013

(86) PCT No.: PCT/EP2013/064354
§ 371 (c)(1),
(2) Date: Jan. 5, 2015

(87) PCT Pub. No.: WO2014/006220
PCT Pub. Date: Jan. 9, 2014

(65) Prior Publication Data

US 2015/0195661 A1 Jul. 9, 2015

Related U.S. Application Data

(60) Provisional application No. 61/668,568, filed on Jul. 6, 2012.

(51) Int. Cl.

| | |
|---|---|
| ***G06F 17/00*** | (2019.01) |
| ***H04R 25/00*** | (2006.01) |
| ***H04R 5/04*** | (2006.01) |

(52) U.S. Cl.
CPC ............... *H04R 25/70* (2013.01); *H04R 5/04* (2013.01); *H04R 2205/041* (2013.01)

(58) Field of Classification Search
CPC ....................... H04R 2225/39; H04R 2225/55; H04R 25/50; H04R 25/55; H04R 25/70
See application file for complete search history.

(56) References Cited

U.S. PATENT DOCUMENTS 6,061,431 A * 5/2000 Knappe ............... H04M 1/2475 379/347
6,944,474 B2 9/2005 Rader et al.
(Continued)

FOREIGN PATENT DOCUMENTS

WO 2012066149 A1 5/2012

OTHER PUBLICATIONS

International Search Report for corresponding International PCT Application No. PCT/EP2013/064354, dated Sep. 23, 2013.
(Continued)

*Primary Examiner* — Kile O Blair
(74) *Attorney, Agent, or Firm* — Workman Nydegger

(57) ABSTRACT

A consumer electronics device is arranged for outputting a hearing loss compensated signal. The consumer electronics device comprises an operating system whereon at least one application can be run that yields a sound output signal. Wherein the consumer electronics device further comprises: a first software module adapted for rerouting the sound output signal, and a second software module adapted for receiving from the first software module the rerouted sound output signal, for performing hearing loss compensation on the rerouted sound output signal and for outputting the hearing loss compensated signal.

20 Claims, 3 Drawing Sheets

(56) References Cited

U.S. PATENT DOCUMENTS

| | | | | |
|---|---|---|---|---|
| 7,257,372 | B2 | 8/2007 | Kaltenbach et al. | |
| 7,430,299 | B2 * | 9/2008 | Armstrong | H04R 25/30 381/312 |
| 7,529,545 | B2 | 5/2009 | Rader et al. | |
| 8,392,631 | B1 * | 3/2013 | Mora | G06F 13/00 709/228 |
| 8,442,435 | B2 * | 5/2013 | Jones | H04M 1/60 455/41.1 |
| 2001/0041602 | A1 | 11/2001 | Berger et al. | |
| 2005/0135644 | A1 | 6/2005 | Qi | |
| 2007/0195973 | A1 * | 8/2007 | Kaulberg | G10L 21/0208 381/94.3 |
| 2013/0053094 | A1 * | 2/2013 | Inagaki | H04M 1/6025 455/550.1 |
| 2014/0052438 | A1 * | 2/2014 | Yerrace | G06F 3/162 704/201 |

OTHER PUBLICATIONS

Wikipedia, URL: http://en.wikipedia.org/wiki/One-time_password, Downloaded Dec. 31, 2014.

Wikipedia, URL: http://en.wikipedia.org/wiki/Smart_TV, Downloaded Dec. 31, 2014.

* cited by examiner

CONSUMER ELECTRONICS DEVICE ADAPTED FOR HEARING LOSS COMPENSATION

FIELD OF THE INVENTION

The present invention is generally related to the field of consumer devices adapted for hearing impaired users.

BACKGROUND OF THE INVENTION

Consumer devices like personal computers or smartphones play an important role in the life of most hearing impaired users. However, with few exceptions, manufacturers design these devices for normal hearing users. Consequently, the audio output of these devices is often inadequate for hearing impaired users.

In these devices loud signals are treated in the same way as soft signals, while hearing impaired users need more gain for soft signals than for loud signals. Thus, hearing impaired users are left with the options to buy louder speakers or simply to crank up the volume. FIG. 1 shows a personal computer used by a hearing impaired user that does not have hearing aids.

Some devices offer predefined equalizers that change the gain as function of the audio frequency. However, this is insufficient for hearing impaired users because the equalizer is not adapted to their individual hearing loss.

Users that own and use hearing aids, receive individual amplification while they use consumer devices, as illustrated in FIG. 2. This solution is also far from optimal, because the audio signal transmitted by the consumer device needs to be picked up by the microphone of the hearing aid and during this transformation the signal suffers from the limited sound quality of the microphone and the limited frequency range of the hearing aid. Also, the hearing aid microphone picks up additional environmental noise and the hearing aid is not aware of the type of input signal (for example speech or music) and it is not able to optimize its signal processing to the type of signal.

In both scenarios sketched above (with and without hearing aids) the computational power of consumer devices is not used to help the hearing impaired user to better understand speech or to enjoy music.

Although the majority of consumer products are not made with hearing impaired users in mind, a small number of products do exploit the computational power of consumer devices to provide hearing loss compensation for hearing impaired users. One example concerns iPhone applications for the hard of hearing, some of them including music players tailored for allowing hearing impaired users to enjoy music, e.g., http://listenapp.jacoti.com. As another example, Bluetooth headsets from the company Sound ID provide personalized sound processing that can be beneficial both for hearing impaired users and for normal users in difficult hearing situations.

Also some patents relate to the adaptation of consumer devices for hearing impaired users. U.S. Pat. No. 7,257,372 relates to a Bluetooth enabled hearing aid, where the hearing aid includes an acoustic echo canceller. Patent documents U.S. Pat. Nos. 6,944,474 and 7,529,545 propose a mobile phone including resources applying measures of an individual's hearing profile, a personal choice profile and induced hearing loss profile (which takes into account the environmental noise), separately or in combination, to build the basis of sound enhancement.

In application US2005/135644 a digital cell phone is described with built-in hearing aid functionality. The device comprises a digital signal processor and a hearing loss compensation module for processing digital data in accordance with a hearing loss compensation algorithm. The hearing loss compensation module can be implemented as a program executed by a microprocessor. The proposed solution also exploits the superior performance in terms of processing speed and memory of the digital cell phone as compared to a hearing aid. The wireless download capabilities of digital cell phones are said to provide flexibility to the control and implementation of hearing aid functions. The incoming digitized signal is processed by a digital filter bank, whereby the received signals are split into different frequency bands. Each filter in the filter bank possesses an adequate amount of stop-band attenuation. Additionally, each filter exhibits a small time delay so that it does not interfere too much with normal speech perception (dispersion) and production. In the proposed system the audio signal captured during a phone call is used as the main input. Hence, the proposed solution is limited to providing hearing loss compensation during phone calls.

Existing solutions can be represented by a scheme as in FIG. 3. It corresponds to a schematic representation of existing solutions in consumer devices tailored for hearing impaired users. A computer executes an application that implements hearing loss compensation and uses standard or specialized speakers. While sound produced by the application with hearing loss compensation can provide excellent speech intelligibility and music quality, the audio output of all the other applications executed on the same consumer device are not adapted to the needs of the hearing impaired user.

For hearing impaired users it would be desirable to see manufacturers of operating systems (OS) for computers (e.g., Windows, Linux, Mac OS X) and smartphones (e.g., Android, Windows Phone, iOS, Bada) to support hearing impaired users of their system. Such a support does not exist at present, but it would allow the processing of all sound output according to the amplification need of the individual user. There is clearly a need for such a solution.

SUMMARY OF THE INVENTION

It is an object of embodiments of the present invention to provide for a consumer device whereby all sound output can be processed according to the amplification need of an individual hearing impaired user.

The above objective is accomplished by the solution according to the present invention.

In a first aspect the invention relates to a consumer electronics device arranged for output a hearing loss compensated signal, said device comprising an operating system whereon at least one application can be run that yields a sound output signal, a first software module adapted for rerouting said sound output signal, a second software module adapted for receiving from said first software module said rerouted sound output signal, for performing hearing loss compensation on said rerouted sound output signal for one or more users and for outputting one or more hearing loss compensated signals.

A consumer electronics device according to this invention comprises an operating system whereon at least one application can be run that yields a sound output signal. In normal circumstances, i.e. when that at least one application is used by a normal hearing person, this sound output signal is directly output to the user. The device according to this invention however comprises a first software module adapted for rerouting said sound output signal. It is important to realize that the rerouted signal is not a copy of the signal at the output of the consumer device; the sound output signal is actually removed from the normal output and instead made available to a second software module. In this second software module the sound output signal undergoes hearing loss compensation processing. The second software module makes sure the resulting hearing loss compensated signal is output towards to the hearing impaired user.

In a preferred embodiment the first software module is a virtual sound device that is registered with the operating system as currently selected sound output device. This software module can be a kernel extension or a plug-in. The second software module is an application that runs in the user space of the operating system and receives the sound signal from the first software module, performs hearing loss compensation and sends the processed sound signal to the physical sound hardware.

The signal that has been rerouted by the first software module can be a music signal and in this case, the second software module can run algorithms to classify the music into one of many music genres. This classification is typically executed in two steps. In a first step a set of descriptors of the music is calculated all of which describe specific properties of the music, e.g., zero-crossings, centre of gravity of the spectrum, parameters of the Mel-frequency cepstrum, etc. In a second step, the distance of these descriptors to other pieces of music with a known genre is compared to determine the most likely genre.

In one embodiment the consumer electronics device further comprises an additional output for outputting an additional sound output signal that is not compensated for hearing loss. This additional signal is then intended for normal hearing persons.

In a preferred embodiment the second software module comprises a first signal path provided with filtering means for filtering the rerouted sound output signal and a second signal path in parallel with the first signal path, said second signal path arranged for calculating a transfer function of the filtering means and passing filtering coefficients to the filtering means. The filtering of the first signal path provides for means of the hearing loss compensation, including alterations of the transfer function, automatic gain control, brick wall limiter, noise reduction, etc.

Preferably the second signal path is arranged for receiving a set of parameters from a control logic block.

In an embodiment the consumer electronics device is adapted for use in a fitting session in which a hearing professional adjusts the parameters of the hearing loss compensation while the hearing impaired listens to an audio signal being processed using these new parameters.

Advantageously, the set of parameters takes into account user preferences and information on the listening situation in which the consumer electronics device is used, obtained through a secondary input, e.g., a microphone that is connected to the computer.

In another aspect the invention relates to a method for allowing a consumer electronics device to output a hearing loss compensated signal. The consumer electronics device comprises an operating system whereon at least one application can be run that yields a sound output signal. The method comprises the steps of providing the consumer electronics device with a first software module adapted for rerouting the sound output signal, providing the consumer electronics device with a second software module adapted for receiving from the first software module the rerouted sound output signal and for performing hearing loss compensation on the rerouted sound output signal and for outputting the hearing loss compensated signal.

The proposed method allows upgrading a consumer electronics device that was originally not designed or arranged for outputting hearing loss compensated signals to a device capable of outputting sound signals that are compensated for hearing loss in a way that meets the specific needs of the hearing impaired user (i.e. whereby the compensation is performed using parameter settings adapted to the user).

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
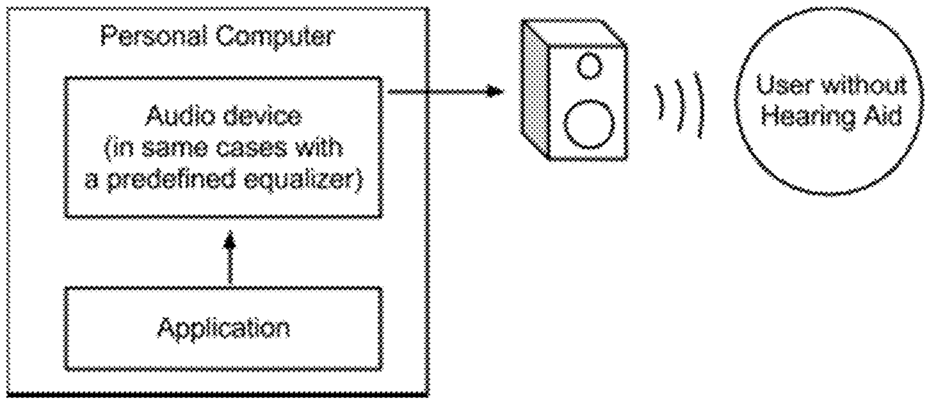
Prior Art Fig. 1
FIG. 1 illustrates the way a personal computer is used by a hearing impaired person without hearing aid.
Figure 2:
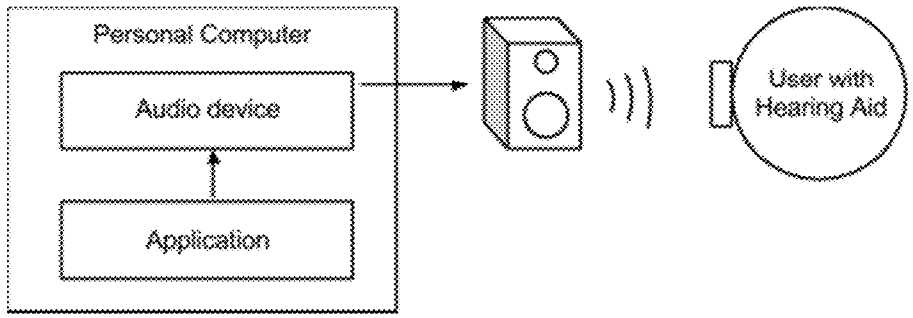
Prior Art Fig. 2
FIG. 2 illustrates the way a personal computer is used by a hearing impaired user with hearing aid.
Figure 3:
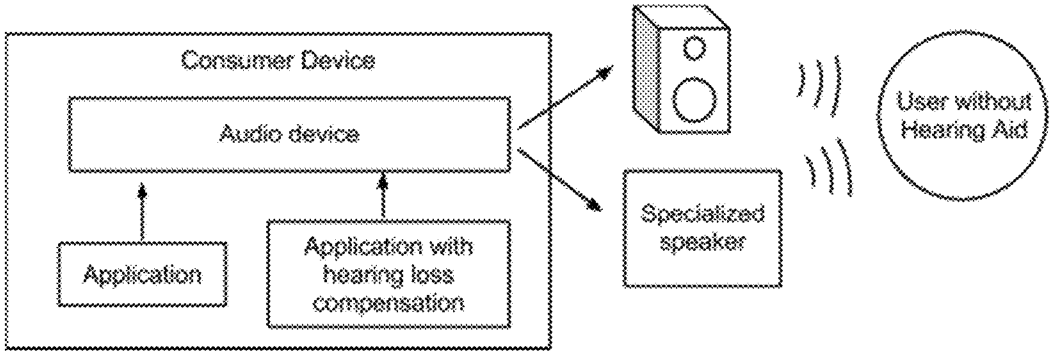
Prior Art Fig. 3
FIG. 3 illustrates a general schematic representation of the prior art solutions.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention provides a solution for hearing impaired users that provides an equally powerful hearing loss compensation and an equally simple usability as the prior art approaches described above, but with the advantage that it can be implemented independent of the operating system (OS) manufacturer.

A straightforward implementation of hearing loss compensation and its integration with an operating system would be based on a virtual audio device (e.g., a kernel extension in Mac OS X or a kernel module in Linux). This audio device would process the audio signal and hand the processed audio signal back to hardware capable of sound output. However, many operating systems impose strict rules on the implementation of virtual audio devices e.g., not allowing floating point operations in a virtual audio device, forcing the implementation of the hearing loss compensation algorithms to be implemented with integer operations only, not allowing any graphical user interfaces and forbidding access to the Internet.

The invention overcomes the above-mentioned limitations by splitting the requirements into two modules that communicate through mechanisms of the operating system. This modularization overcomes restrictions imposed on virtual audio devices. A first software module is implemented as a virtual audio device that captures the audio signal from the system and makes it available to the second software module. The second software module processes the audio signal with the purpose of hearing loss compensation and also provides means to optimize parameters of this hearing loss compensation (e.g., the user's audiogram, parameters of the filtering, the automatic gain control noise reduction, etc.) through a graphical user interface (GUI) or through a server to which the second software module is connected through the Internet. As opposed to an application on the consumer device that is tailored for hearing impaired users, the invention allows capturing and processing all sound output of the consumer device, even in the case of closed source applications like for example Skype.

In the proposed approach a virtual audio device software module is added to the operating system of the consumer device, whereby operating system is understood as the software that manages the consumer device's hardware resources and provides common services for the applications running on the consumer device in the form of an application programming interface (API). A virtual audio device is an audio device that is not routing the audio signal to audio hardware, but instead uses the audio signal differently. Since applications cannot distinguish between virtual audio sound devices and audio devices that are connected to audio hardware, any application can route its sound output to the virtual audio device of the invention. In addition, many operating systems have a mechanism to install a virtual device as the default audio output device for all applications. The output of the virtual device is routed to a second software module which provides hearing loss compensation. The second software module then outputs the processed audio signal to audio hardware.

Figure 4:
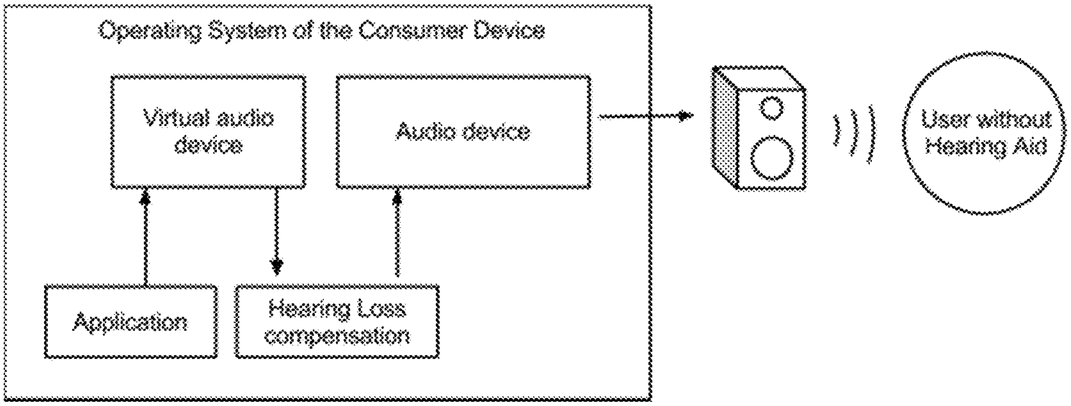
FIG. 4 illustrates a block scheme of an embodiment of the proposed solution.

FIG. 4 illustrates a basic block scheme of the solution proposed in this invention. Via a virtual device, from a user perspective, the hearing loss compensation becomes part of the operating system of his consumer device.

The operating system can in some cases allow detecting the audio input and audio output hardware. In this case, one can consult a database to yield optimal sound quality with the detected audio hardware, for example by compensating for a transfer function of speakers that is not flat.

The signal processing in the virtual audio device needs to be optimized for processing small buffers and the additional signal delay of the digital filters in the hearing loss compensation module need to be optimized in order to keep signal delays low.

Figure 5:
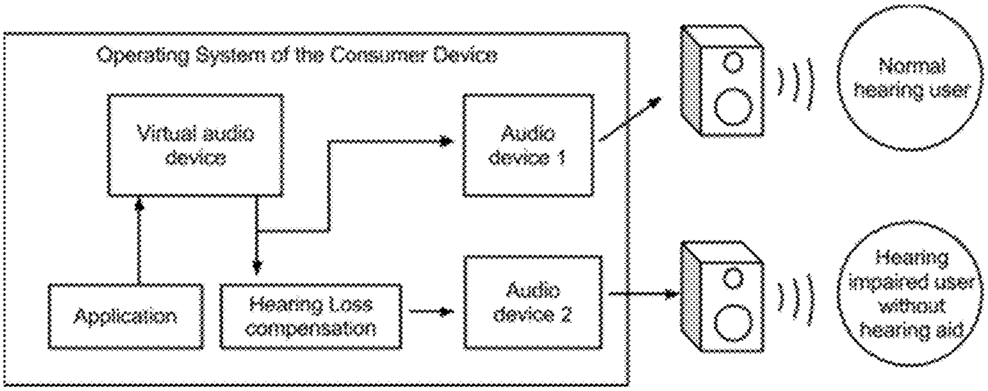
FIG. 5 represents an embodiment wherein simultaneously sound output is provided for normal hearing users and for hearing impaired users.
Figure 6:
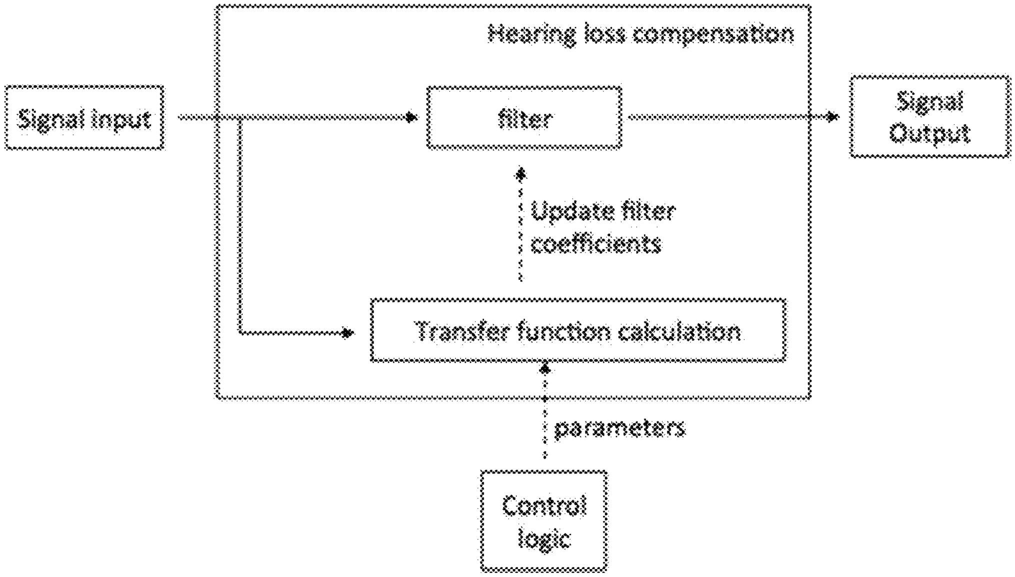
FIG. 6 illustrates a block scheme of a possible implementation of the software module for hearing loss compensation.

Some consumer devices are simultaneously used by normal hearing and by hearing impaired users. Examples are conference systems and TV sets used in families with one or more hearing impaired family members. In these cases, the solution of the invention can provide multiple sound output signals as shown in FIG. 5.

For implementing the proposed solution an operating system is needed allowing (a) execution of third party applications and (b) allowing writing and installing a virtual audio device to the system. The class of consumer devices that fulfils these criteria includes but is not limited to personal computers—desktop and laptop—, music players as well as some smartphones. However, in the future, a growing number of smartphones, game consoles and modern smart TVs will be based on computer-like hardware and software architectures that meets the above-mentioned requirements (see for example http://en.wikipedia.org/wiki/Smart_TV). Another example of consumer devices that can benefit from the proposed solution concerns conference systems. Apart from supporting hearing impaired users, normal hearing users of these conference systems can benefit from better speech intelligibility if the sound is processed by the hearing loss compensation module.

The software implemented hearing loss compensation module as included in the above diagrams can have many embodiments. One embodiment can be identical to the hearing loss compensation module described in international patent application WO2012/066149, which is hereby incorporated by reference in its entirety.

The hearing loss compensation module receives a digital input signal and a set of parameters. The set of parameters is calculated by a control logic. Inputs of the control logic include, but are not limited to, user preferences, parameters received from a server through the Internet and information on the listening situation in which the consumer device is used, obtained through a secondary input, e.g., a microphone connected to the computer. Further audiological information based on audiograms or other audiological measurements may advantageously be exploited.

If the hearing impaired user is in a remote fitting session with a hearing professional, e.g., though a VoIP call with or without video, the voice of the hearing professional can be compensated for the hearing loss by the present invention. The invention can be combined with means that allow the hearing professional to alter the parameters of the hearing loss compensation in the second software module during the remote fitting session.

In this preferred embodiment a first signal path in the hearing loss compensation module is provided with filtering means for filtering a digital audio signal input to generate a sound signal suitable to improve the sound quality and speech intelligibility for the hearing impaired user. The second signal path works in parallel to the first signal path. The second signal path is receiving the input signal and determines the desired gain in one or more frequency bands. The second signal path can also receive the set of parameters as described above. The second signal path contains a module for transfer function calculation which determines the filter coefficients in the filter used in the first signal path based on the received set of parameters.

In a more specific embodiment the invention can be used in the rehabilitation process of an implantable auditory prosthesis, e.g., a cochlear implant. In this process, the invention can be used to apply alternative pre-processing strategies without changing the programming of the prosthesis.

Figure 7:
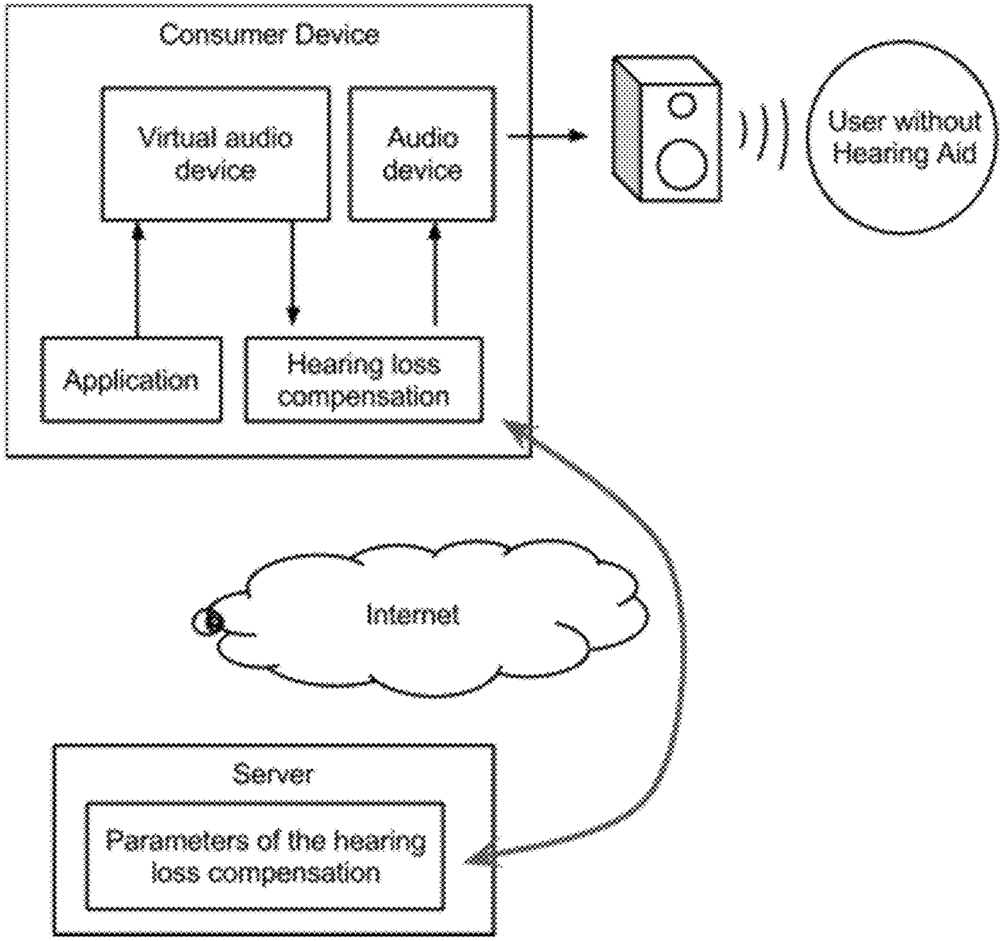
FIG. 7 illustrates an embodiment wherein the consumer device is connected with a server via the Internet.

Consumer products as described above provide in most cases an Internet connection. In this case one can achieve additional benefit from the invention by exchanging data with a server. The data exchanged between the consumer device and the server can include a complete set of parameters that define the audio processing in the hearing loss compensation module. In addition, audio recordings and other metadata can be transmitted. FIG. 7 provides an illustration.

If such an Internet connection is provided, the solution according to the invention is able to use a server to:

- Allow hearing professionals to adjust parameters of the hearing loss compensation remotely in a remote fitting session between a hearing impaired user and an expert. This remote fitting session allows the hearing expert to help a hearing impaired user even if the user is not in the expert's physical proximity.
- The rehabilitation process of implantable auditory prostheses can use a computer or a consumer device to allow the expert to use the Internet connection to help the rehabilitation by altering parameters of the sound in the consumer device or by changing the pre-processing or stimulation pattern generation in the implantable auditory prosthesis.
- Allow the user to synchronize parameters of the hearing loss compensation between multiple devices, either by an identification of the user (e.g., through a username and password) or by the usage of temporary one time passwords generated on one device and then used on a second device (http://en.wikipedia.org/wiki/One-time-_password). The user can upload audio signals to a server to allow a hearing expert to listen to a situation that is difficult to cope with for the hearing impaired user. The expert can then try to optimize the hearing loss compensation parameters to help in this specific situation.
- The consumer device can automatically upload audio signals to a server. These include the audio signal processed in the second software module and can also include a sound signal of the listening situation of the hearing impaired user for an automatic classification. A classification of the listening situation can be used on the server to modify parameters of the hearing loss compensation in the device or the classification can be sent to the consumer device to allow applying local changes in the device to optimize the signal processing to the listening situation.

In another alternative implementation the data exchanged between the consumer device and the server is single parameters.

The invention can be useful in a large family of applications in personal computers and smartphones like music player, video player, Internet browsing with sound, VoIP telephony, sound effects from games, or Internet radios. The invention is also useful on dedicated systems like game consoles, DVD players, MP3 players, audio systems in cars, conference systems, smart TVs, Bluetooth headsets, and so on. Any of these applications can be useful for hearing impaired users and for normal hearing users in difficult listening situations.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. Method for allowing a consumer electronics device to output a hearing loss compensated signal, the consumer electronics device comprising an operating system whereon at least one application can be run that yields a sound output signal prepared for output to a sound device without substantially being altered, comprising the steps of:

providing said consumer electronics device with a first software module adapted for rerouting said sound output signal, said first software module being a virtual sound device capable of being registered and deregistered with said operating system as a currently selected sound output device, said first software module being written and installed in said operating system;

providing said consumer electronics device with a second software module adapted for receiving from said first software module said rerouted sound output signal and for performing hearing loss compensation on said rerouted sound output signal and for outputting said hearing loss compensated signal, wherein the first software module and second software modules are separate and communicate through mechanisms of the operating system, and the operating system restricts the first software module from performing hearing loss compensation, wherein said first software module is restricted from performing floating point operations, capable of performing integer operations only, incapable of allowing any graphical user interfaces and incapable of accessing the Internet, and wherein said second software module is not restricted from performing floating point operations, capable of allowing graphical user interfaces and capable of accessing the Internet.

2. The method as in claim 1, wherein said first software module is a kernel extension or a plug-in of said operating system.

3. The method as in claim 1, wherein said second software module is an application arranged to run in the user space of the operating system.

4. The method as in claim 1, further comprising an additional output for outputting an additional sound output signal that is not compensated for hearing loss.

5. The method as in claim 1, wherein said second software module comprises a first signal path provided with filtering means for filtering said rerouted sound output signal and a second signal path in parallel with said first signal path, said second signal path arranged for calculating a transfer function of said filtering means and passing filtering coefficients to said filtering means.

6. The method as in claim 1, wherein said second software module is configured to exchange data with a remote server, the data includes a set of parameters defining the hearing loss compensation.

7. Consumer electronics device arranged for outputting a hearing loss compensated signal, said consumer electronics device comprising an operating system whereon at least one application can be run that yields a sound output signal prepared for output to a sound device without substantially being altered, wherein said consumer electronics device further comprises:

a first software module adapted for rerouting said sound output signal, said first software module being a virtual sound device capable of being registered and deregistered with said operating system as a currently selected sound output device, said first software module being written and installed in said operating system; and a second software module adapted for receiving from said first software module said rerouted sound output signal, for performing hearing loss compensation for one or more users on said rerouted sound output signal and for outputting one or more hearing loss compensated signals, wherein the first software module and second software modules are separate and communicate through mechanisms of the operating system, and wherein said first software module is restricted from performing floating point operations, capable of performing integer operations only, incapable of allowing any graphical user interfaces and incapable of accessing the Internet, and wherein said second software module is not restricted from performing floating point operations, capable of allowing graphical user interfaces and capable of accessing the Internet.

8. The consumer electronics device as in claim 7, wherein said first software module is a kernel extension or a plug-in of said operating system.

9. The consumer electronics device as in claim 7, wherein said second software module is an application arranged to run in the user space of the operating system.

10. The consumer electronics device as in claim 7, further comprising an additional output for outputting an additional sound output signal that is not compensated for hearing loss.

11. The consumer electronics device as in claim 7, wherein said second software module comprises a first signal path provided with filtering means for filtering said rerouted sound output signal and a second signal path in parallel with said first signal path, said second signal path arranged for calculating a transfer function of said filtering means and passing filtering coefficients to said filtering means.

12. The consumer electronics device as in claim 11, wherein said second signal path is arranged for receiving a set of parameters from a control logic block.

13. The consumer electronics device as in claim 12, wherein said set of parameters takes into account user preferences and information on the listening situation in which the consumer electronics device is used.

14. The consumer electronics device as in claim 12, wherein said set of parameters takes into account user preferences and genre classification of music being reproduced.

15. The consumer electronics device as in claim 12, wherein said consumer electronics device is adapted for use in a fitting session in which a hearing professional adjusts one or more parameters of said set of parameters of the hearing loss compensation while the hearing impaired listens to the audio signal being processed using said adjusted one or more parameters.

16. The consumer electronics device as in claim 7, wherein said consumer electronics device is a personal computer.

17. The consumer electronics device as in claim 7, wherein said second software module is configured to exchange data with a remote server, the data includes a set of parameters defining the hearing loss compensation.

18. The consumer electronics device as in claim 7, wherein, when said first software module is registered with said operating system, the first software module captures all sound output of the consumer device.

19. The consumer electronics device as in claim 18, wherein the sound output of the consumer device includes sound output of at least one closed source application.

20. Consumer electronics device arranged for outputting a hearing loss compensated signal, said consumer electronics device comprising an operating system whereon at least one application can be run that yields a sound output signal prepared for output to a sound device without substantially being altered, wherein said consumer electronics device further comprises:

a first software module adapted for rerouting said sound output signal, said first software module being a virtual sound device capable of being registered and deregistered with said operating system as a currently selected sound output device, said first software module being written and installed in said operating system; and a second software module adapted for receiving from said first software module said rerouted sound output signal, for performing hearing loss compensation for one or more users on said rerouted sound output signal and for outputting one or more hearing loss compensated signals, wherein the first software module and second software modules are separate and communicate through mechanisms of the operating system, wherein said first software module is restricted from performing floating point operations, capable of performing integer operations only, incapable of allowing any graphical user interfaces and incapable of accessing the Internet, wherein said second software module is not restricted from performing floating point operations, capable of allowing graphical user interfaces and capable of accessing the Internet, and wherein said second software module is configured to exchange data with a remote server, the data includes a set of parameters defining the hearing loss compensation.

* * * * *